May 5, 1964

J. R. MANNING 3,131,444

WIRE HOSE CLAMP

Filed March 26, 1962

INVENTOR.
John R. Manning
BY

*[signature]*

ATTORNEY

United States Patent Office 3,131,444
Patented May 5, 1964

3,131,444
WIRE HOSE CLAMP
John R. Manning, 7150 W. 24th Place, Denver, Colo.
Filed Mar. 26, 1962, Ser. No. 182,450
1 Claim. (Cl. 24—27)

This invention relates to a clamp for clamping a hose to a hose fitting and has for its principal object the provision of an exceedingly simple highly efficient, one-piece element, which can be economically formed from spring wire and which can be instantly applied to the hose to exert a self-clamping action thereon to securely fasten and seal the hose to the fitting.

While the improved hose clamp can be applied with any suitable gripping tool such as conventional pliers, another object of the invention is to provide a tool especially designed for use with this invention which will securely hold the improved clamp and maintain it in the expanded condition for slipping over the extremity of a hose.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 5:
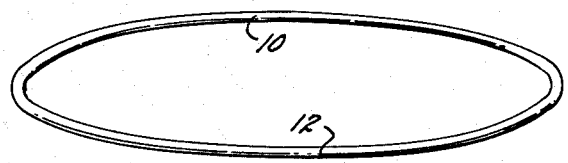
FIG. 5 illustrates a closed loop of spring wire from which the improved hose clamp is formed.

The clamp is formed from a closed loop of relatively stiff resilient spring wire such as high-carbon steel, spring brass or spring bronze such as illustrated in FIG. 5.

The wire loop is flattened to bring two opposite sides, indicated at 10 and 12, into parallel, spaced relation, thence rolling the two parallel sides 10 and 12 into a circle, of substantially less diameter than the outside diameter of the smallest hose upon which the particular clamp is to be used, with one extremity of the parallel sides extending between the sides at the other extremity thereof. The two extremities of the two sides are then bent outwardly and are formed into circular loops 13 and 14 which extend outwardly from the circle formed by the sides in substantially parallel relation to each other.

The first extremities of the sides 10 and 12 approach each other in relatively close relation, as indicated at 15, as they approach the loop 13 so that they may pass between the other extremities of the sides. The sides 10 and 12 at said other extremities are spread to pass on opposite sides of the first extremities and are then bent toward each other over the first extremities, as indicated at 16, to form the closed loop 14.

Figure 1:
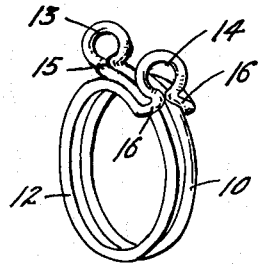
FIG. 1 is a perspective view of the hose clamp of this invention in its natural contracted condition.
Figure 2:
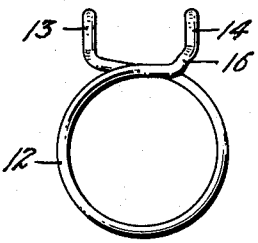
FIG. 2 is a face-elevational view thereof.
Figure 3:
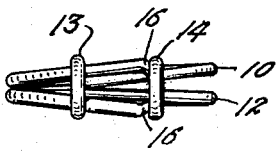
FIG. 3 is a top view thereof.
Figure 4:
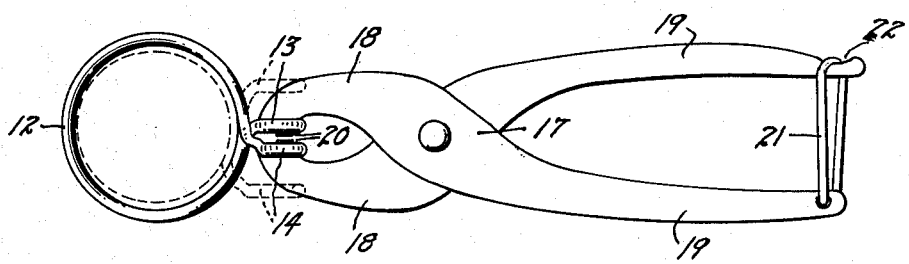
FIG. 4 is a face view of the hose clamp as it would appear when being retained in the expanded condition by an applying tool.

In its natural preformed condition the clamp has the appearance of FIGS. 1. 2 and 3. To apply the clamp over the extremity of a hose, it is necessary to increase the diameter of the circle formed by the double sides. This is accomplished by simply urging the two terminal loops 13 and 14 toward each other as shown in FIG. 4. This will uniformly enlarge the circle sufficiently to enable the clamp to be freely passed over the hose extremity for which it is designed. The loops can then be released and the clamp will tend to return to its original diameter, due to its inherent resiliency, and in so doing will secured, clamp and seal the hose extremity to its fitting.

The loops 13 and 14 can be urged toward each other by any suitable means. One such means is illustrated in FIG. 4 comprising a plier-like tool 17 having relatively short, forwardly projecting jaws 18 and relatively long, rearwardly projecting handles 19.

The forward, opposed surfaces of the jaws 18 are provided with protuberances 20 positioned to enter the open rings 13 and 14 to prevent the clamp from accidentally slipping from the tool as the jaws are closed and an elongated locking ring 21 is pivotally mounted on one of the handles 19 which can be slipped over and into a receiving notch 22 in the other handle to retain the jaws in the clamp expanding position of FIG. 4 against the inherent expanding bias of the clamp. When the clamp has been placed in final position, the locking ring is slipped from its locking position to allow the clamp to contract on the hose.

This invention has been more particularly designed and has been found exceedingly useful for mounting radiator hoses and air conditioning hoses on automotive vehicles but is, of course, not limited to this particular use.

While a specific form of the invention has been described and illustrated herein, it is to be understood that the same may be varied within the scope of the appended claim, without departing from the spirit of the invention.

Having thus described the invention what is claimed and desired to be secured by Letters Patent is:

In a self-tightening hose encircling clamp, the combination comprising, a body portion formed from a closed loop of relatively stiff spring-like resilient wire, said loop including substantially flattened side portions defining a circular clamping frame having overlapping end portions, each of said side portions being interconnected to define first and second ring members, one of said ring members disposed on each of said overlapping end portions, the side portions of said frame adjacent said first ring member being in side-by-side relation in contact with each other, said side portions of said frame adjacent said second ring portion being in spaced relation with respect to each other and in contact with each of said side portions adjacent said first ring portion, said side portions of said frame adjacent said second ring portion further extending arcuately upwardly and inwardly to a point of contact beneath said second ring member and above said side members adjacent said first ring portion whereby said side members adjacent said first ring portion are disposed within the confines of the area defined by said arcuately upward and inwardly directed side portions of said frame adjacent said second ring member, each of said ring members being of substantially identical circular configuration and extending outwardly from the frame in a spaced apart parallel relationship and maintained in said spaced apart relation by the inherent resiliency of said wire, whereby to receive complementary tool parts for urging said rings toward each other to expand said clamp to embrace the hose on which it is disposed.

References Cited in the file of this patent
UNITED STATES PATENTS

| | | |
|---|---|---|
| 492,855 | Weidaw | Mar. 7, 1893 |
| 690,819 | Anderson | Jan. 7, 1902 |
| 2,147,963 | Casciotti | Feb. 21, 1939 |
| 2,180,271 | Arras | Nov. 14, 1939 |
| 2,561,635 | Prochaska | July 24, 1951 |
| 2,793,414 | Arras | May 28, 1957 |
| 2,817,130 | Roberts et al. | Dec. 24, 1957 |
| 2,957,217 | Mortorelli | Oct. 25, 1960 |

FOREIGN PATENTS

| | | |
|---|---|---|
| 545,795 | France | Aug. 2, 1922 |